United States Patent
Bournas

(10) Patent No.: US 7,496,653 B2
(45) Date of Patent: Feb. 24, 2009

(54) METHOD, SYSTEM, AND COMPUTER PROGRAM PRODUCT FOR PROVIDING QUALITY OF SERVICE GUARANTEES FOR CLIENTS OF APPLICATION SERVERS

(75) Inventor: Redha M. Bournas, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 931 days.

(21) Appl. No.: 11/047,105

(22) Filed: Jan. 31, 2005

(65) Prior Publication Data

US 2006/0173982 A1 Aug. 3, 2006

(51) Int. Cl.
G06F 15/173 (2006.01)
G06F 9/46 (2006.01)

(52) U.S. Cl. ............... 709/223; 709/224; 709/225; 709/226; 718/102; 718/105

(58) Field of Classification Search ............ 709/223, 709/224, 225, 226; 718/102, 105
See application file for complete search history.

(56) References Cited

U.S. PATENT DOCUMENTS

| | | | |
|---|---|---|---|
| 6,091,709 A | 7/2000 | Harrison et al. | |
| 6,418,139 B1 | 7/2002 | Akhtar | |
| 6,430,156 B1 | 8/2002 | Park et al. | |
| 6,725,456 B1* | 4/2004 | Bruno et al. | 718/102 |
| 6,748,414 B1 | 6/2004 | Bournas | |
| 6,779,181 B1* | 8/2004 | Yu et al. | 718/102 |
| 6,789,050 B1 | 9/2004 | Reeser et al. | |
| 2002/0091802 A1 | 7/2002 | Paul et al. | |
| 2002/0194343 A1 | 12/2002 | Shenoi et al. | |
| 2003/0067935 A1 | 4/2003 | Hosein | |
| 2003/0074443 A1 | 4/2003 | Melaku et al. | |
| 2003/0223429 A1 | 12/2003 | Bi et al. | |
| 2004/0064582 A1 | 4/2004 | Raghunath et al. | |
| 2004/0203658 A1 | 10/2004 | Narayanan | |
| 2004/0203822 A1 | 10/2004 | Vitebsky | |
| 2004/0264488 A1* | 12/2004 | Yoon et al. | 370/412 |

* cited by examiner

*Primary Examiner*—Saleh Najjar
*Assistant Examiner*—Farzana Huq
(74) *Attorney, Agent, or Firm*—Martin J. McKinley; Hoffman Warnick LLC

(57) ABSTRACT

The present invention provides a method, system, and computer program product for providing quality of service guarantees at the application level for clients of application servers. The method includes: receiving a request for a transaction of type k; calculating a throughput rate $\lambda_i$ of each type of transaction i, $1 \leq i \leq n$, in response to the request for the transaction of type k; calculating an average residual time $R_i$ of each type of transaction i, $1 \leq i \leq n$; calculating an average residual time R of a transaction in service; calculating an average waiting time $W_k$ of a transaction of type k; comparing the average waiting time $W_k$ of a transaction of type k to a required average waiting time $W_k$ of a transaction of type k; and selectively accepting the request for the transaction of type k, based on a result of the comparing step.

3 Claims, 3 Drawing Sheets

METHOD, SYSTEM, AND COMPUTER PROGRAM PRODUCT FOR PROVIDING QUALITY OF SERVICE GUARANTEES FOR CLIENTS OF APPLICATION SERVERS

BACKGROUND OF THE INVENTION

1. Field of the Invention

The present invention generally relates to application servers. More particularly, the present invention provides a method, system, and computer program product for providing quality of service guarantees at the application level for clients of application servers.

2. Related Art

As businesses are outsourcing their information technology (IT) solutions, it is becoming even more important for application providers to focus on the performance requirements demanded by their clients. This problem is even more complex when several applications are concurrently running on the same server and there is a quality of service (QoS) requirement to be met for each application. Such a server system 10 is depicted in FIG. 1, wherein a plurality of clients 12 are accessing a plurality of different applications 14 on an application server 16, and wherein each application 14 has a distinct QoS requirement (e.g., Application 1: QoS 1; Application 2: QoS 2; Application n: QoS n). Business subscribers (a body of clients) of application providers are usually interested in the maximum throughput rate (transactions/second) an application can handle. Clients, however, are usually interested in the average response time when accessing an application on a server.

Enterprise Resource Planning (ERP) applications are an excellent example of applications that require QoS. ERP applications need to be kept available to complete mission-critical business transactions. More specifically, it is a business requirement to avoid slow or incomplete transactions and session timeouts for ERP clients, which can lock a record in an open state that requires manual intervention. Other mission critical applications that require QoS are used, for example, in financial services, manufacturing, entertainment, and e-commerce.

QoS is specific measure of response time or throughput rate. It represents the ability of a network element such as a host, router, or application to have some level of assurance that its service requirements can be satisfied. Each application type will generally have a different QoS requirement. Usually the services provided by the servers for the clients fall into two categories:

(1) Retrieval of information; and
(2) Performance of computations.

An application in category (1) may have a QoS that is drastically different than that of an application in category (2). Requests for a service in category (1) are normally short-lived since they are static and non-interactive. Requests for a service in category (2) are not normally as short-lived as those of category (1), and they usually have longer response times. Each service type has a QoS requirement that is independent of the system load.

Current QoS methodology focuses on the area of bandwidth allocation at the network transmission level to meet QoS requirements. Such methods either over-allocate network bandwidth or prioritize network traffic to meet QoS requirements in peak load periods. Unfortunately, QoS assurances at the application level, especially when there are several types of traffic sources competing for a single server (e.g., as shown in FIG. 1), have not been addressed.

SUMMARY OF THE INVENTION

The present invention addresses the performance of server systems that provide several types of services for their clients. Examples of such server systems include Web servers, enterprise servers, etc. These types of server systems typically comprise at least one server concurrently running a plurality of different types of applications, each having distinct performance characteristics. The present invention addresses the problem of meeting QoS requirements required by the clients of such a server system. An algorithm based on a queuing system with priority of service is provided to dynamically determine whether to accept or reject a new incoming transaction into the server system, such that the QoS requirements for all types of client requests are met at all times.

The present invention provides a method, system, and computer program product for providing QoS guarantees at the application level for clients of application servers. The QoS methodology of the present invention accepts as input the average response time requirement for each type of transaction. At each epoch of a new transaction, it estimates the average arrival rate of transactions of this type. Based on the most recent estimates of the throughput rate of all other types of transactions and the average response time requirement of each transaction type, the present invention employs a mechanism to estimate the average response time of the new incoming transaction. If the estimate falls within an acceptable range, the request is accepted. If the estimate falls outside the acceptable range, the request is denied.

It is desirable to keep the response time as low as possible and to have the throughput-rate as high as possible. However, as the average throughput rate of transactions increases, the average response time of a transaction increases also. Applications are designed to meet an average response time value and average throughput rate value pair (a pair in the "middle" of the curve) that is acceptable to both clients and business subscribers. A QoS response time requirement can then be any number less than or equal to that of the "middle" point. Likewise, a QoS throughput requirement can then be any number less than or equal to that of the "middle" point. In the case of only one application running on a server, the server must know the "middle" point throughput rate value and the current system throughput rate to decide on whether the QoS response time of a new arriving transaction will be met or not. In the case of several applications running on the server, however, the QoS response time decision methodology is not readily apparent. The present invention focuses on this specific problem and provides a methodology to make a decision on whether the QoS response time of a new arriving transaction will met or not.

A first aspect of the present invention is directed to a method for providing quality of service guarantees in a system, comprising: receiving a request for a transaction of type k; calculating a throughput rate $\lambda_i$ of each type of transaction i, $1 \leq i \leq n$, in response to the request for the transaction of type k; calculating an average residual time $R_i$ of each type of transaction i, $1 \leq i \leq n$; calculating an average residual time R of a transaction in service; calculating an average waiting time $W_k$ of a transaction of type k; comparing the average waiting time $W_k$ of a transaction of type k to a required average waiting time $\overline{W}_k$ of a transaction of type k; and selectively accepting the request for the transaction of type k, based on a result of the comparing step.

A second aspect of the present invention is directed to a method for providing quality of service guarantees in a system, comprising: receiving a request for a transaction of a first type; determining an average arrival rate of transactions of the first type; determining a throughput rate of all other types of transactions; determining an average response time requirement of each type of transaction; determining an average response time of a transaction of the first type; and accepting the received transaction request if the determined average response time of a transaction of the first type falls within an acceptable range.

A third aspect of the present invention is directed to a method for providing quality of service guarantees in a system, comprising: receiving a request for a transaction; determining if a quality of service guarantee for all transactions in the system will be met if the received transaction request is accepted; and accepting the received transaction request only if it is determined that the quality of service guarantee for all transactions in the system will be met.

A fourth aspect of the present invention is directed to a system for providing quality of service guarantees in a server system, comprising: a system for receiving a request for a transaction of type k; a system for calculating a throughput rate $\lambda_i$ of each type of transaction i, $1 \leq i \leq n$, in response to the request for the transaction of type k; a system for calculating an average residual time $R_i$ of each type of transaction i, $1 \leq i \leq n$; a system for calculating an average residual time R of a transaction in service; a system for calculating an average waiting time $W_k$ of a transaction of type k; a system for comparing the average waiting time $W_k$ of a transaction of type k to a required average waiting time $W_{\bar{k}}$ of a transaction of type k; and a system for selectively accepting the request for the transaction of type k, based on a result provided by the system for comparing.

A fifth aspect of the present invention is directed to a program product stored on a computer recordable medium for providing quality of service guarantees in a system, the computer readable medium comprising program code for performing the following steps: receive a request for a transaction of type k; calculate a throughput rate $\lambda_i$ of each type of transaction i, $1 \leq i \leq n$, in response to the request for the transaction of type k; calculate an average residual time $R_i$ of each type of transaction i, $1 \leq i \leq n$; calculate an average residual time R of a transaction in service; calculate an average waiting time $W_k$ of a transaction of type k; compare the average waiting time $W_k$ of a transaction of type k to a required average waiting time $W_{\bar{k}}$ of a transaction of type k; and selectively accept the request for the transaction of type k, based on a result of the comparing step.

A sixth aspect of the present invention is directed to a system for deploying an application for providing quality of service guarantees in a server system, comprising: a computer infrastructure being operable to: receive a request for a transaction of type k; calculate a throughput rate $\lambda_i$ of each type of transaction i, $1 \leq i \leq n$, in response to the request for the transaction of type k; calculate an average residual time $R_i$ of each type of transaction i, $1 \leq i \leq n$; calculate an average residual time R of a transaction in service; calculate an average waiting time $W_k$ of a transaction of type k; compare the average waiting time $W_k$ of a transaction of type k to a required average waiting time $W_{\bar{k}}$ of a transaction of type k; and selectively accept the request for the transaction of type k, based on a result of the comparing step.

A seventh aspect of the present invention is directed to computer software embodied in a propagated signal for providing quality of service guarantees in a system, the computer software comprising instructions to cause a computer system to perform the following functions: receive a request for a transaction of type k; calculate a throughput rate $\lambda_i$ of each type of transaction i, $1 \leq i \leq n$, in response to the request for the transaction of type k; calculate an average residual time $R_i$ of each type of transaction i, $1 \leq i \leq n$; calculate an average residual time R of a transaction in service; calculate an average waiting time $W_k$ of a transaction of type k; compare the average waiting time $W_k$ of a transaction of type k to a required average waiting time $W_{\bar{k}}$ of a transaction of type k; and selectively accept the request for the transaction of type k, based on a result of the comparing step.

BRIEF DESCRIPTION OF THE DRAWINGS

These and other features of this invention will be more readily understood from the following detailed description of the various aspects of the invention taken in conjunction with the accompanying drawings in which.

Figure 1:
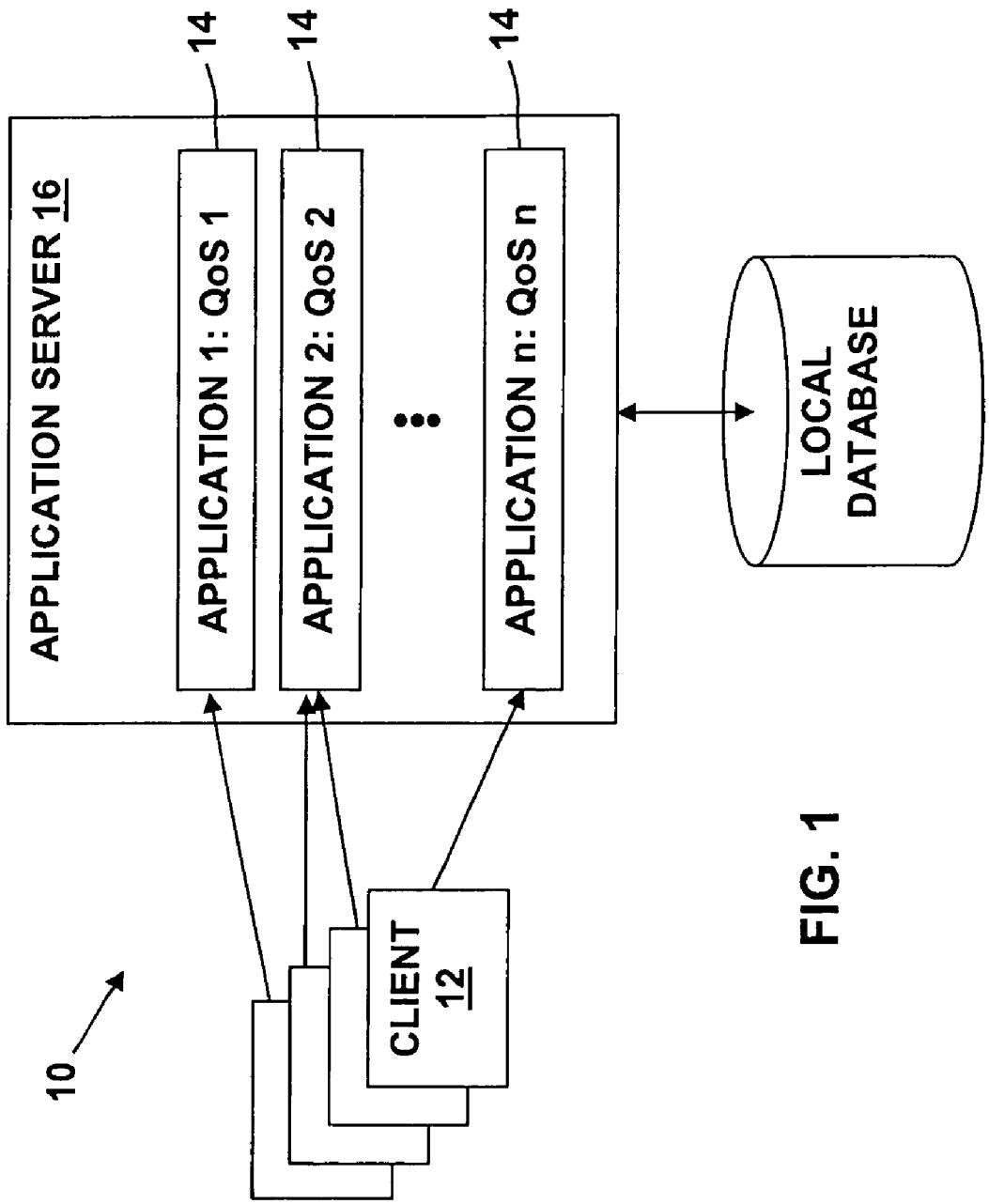
FIG. 1 depicts an illustrative server system in accordance with the prior art, wherein a plurality of applications are concurrently running on a server.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system, and computer program product for providing QoS guarantees at the application level for clients of application servers. The QoS methodology of the present invention accepts as input the average response time requirement for each type of transaction. At each epoch of a new transaction, it estimates the average arrival rate of transactions of this type. Based on the most recent estimates of the throughput rate of all other types of transactions and the average response time requirement of each transaction type, the present invention employs a mechanism to estimate the average response time of the new incoming transaction. If the estimate falls within an acceptable range, the request is accepted. If the estimate falls outside the acceptable range, the request is denied.

For clarity, the description of QoS methodology of the present invention is organized into the following sections:

(1) Problem Formulation;
(2) Mathematical Analysis and Solution Methodology;
(3) Measurement and Estimation Methodology; and
(4) Conclusions.

(1) Problem Formulation

Assuming there are n types of transactions, let $T_{\bar{i}}$ represent the average response time QoS requirement for transactions of type i, $1 \leq i \leq n$. Without loss of generality, it is assumed that $T_{\bar{1}} \leq T_{\bar{2}} \leq \ldots \leq T_{\bar{n}}$. Each response time requirement $T_{\bar{i}}$, $1 \leq i \leq n$, is measured according to first and second order service time probability distributions. For each transaction type i, $1 \leq i \leq n$, the average response time $T_{\bar{i}}$ is measured in an environment where only transactions of type i are active.

While maintaining the QoS requirement $T_i$, it is assumed that the maximum average service rate of transactions of type i, $1 \leq i \leq n$, is measured in an environment where only transactions of type i are active, is $\mu_i$.

The present invention addresses the problem of meeting the QoS requirement for each type of transaction i, $1 \leq i \leq n$, in an environment where all the types of transactions are concurrently active. Assuming that the arrival rate of transactions of type i, $1 \leq i \leq n$, is $\lambda_i$, and that the average response time of these transactions is denoted by $T_i$, then the QoS requirement equations to be solved are:

$$T_i \leq T_i, 1 \leq i \leq n. \qquad [1]$$

When a new transaction of type i, $1 \leq i \leq n$, arrives at the system, the decision of whether to accept or reject the new transaction in the system is based on the following information:
(A) The system throughput rates $\lambda_i$ for each transaction of type i, $1 \leq i \leq n$, at the time of arrival of the transaction;
(B) The QoS requirements $T_i$ for each transaction of type i, $1 \leq i \leq n$; and
(C) The service rates $\mu_i$, $1 \leq i \leq n$.

The present invention provides rules to be used by the server upon the arrival of a new transaction. The rules allow the server to decide whether to accept or reject the new transaction such that the QoS guarantees of all transactions in the system are met. It should be noted that the analysis and methodology presented below also apply if instances of the same application are running on the same server. In that case, a routing algorithm should be used to keep the instances as evenly load balanced as possible.

(2) Mathematical Analysis and Solution Methodology

The present invention approaches the above-described problem as a queueing system with priority of service. That is, the highest priority of service is given to the source of traffic with the shortest response time, the second highest priority of service to the source of traffic with the second shortest response time, and so on. We let $\lambda_i$ be the average arrival rate (throughput rate) of a transaction of type i, $1 \leq i \leq n$.

(2.1) Average Waiting Time Estimation for each Traffic Source

First, a formula for the average waiting time of a transaction of type i, $1 \leq i \leq n$, is determined. If R is the average residual time of a transaction in service, and $W_i$ is the average waiting time of a transaction of type i, $1 \leq i \leq n$, then using the formulas in [1] for a queueing system with priorities gives:

$$W_i = \frac{R}{(1 - \rho_1 - \ldots - \rho_{i-1})(1 - \rho_1 - \ldots - \rho_i)}, \qquad [2]$$

where $\rho_i = \lambda_i / \mu_i$, $1 \leq i \leq n$, and $\rho_0 = 0$. Also:

$$T_i = W_i + \frac{1}{\mu_i}, 1 \leq i \leq n, \text{ and} \qquad [3]$$

$$\tilde{T}_i = \tilde{W}_i + \frac{1}{\mu_i}, 1 \leq i \leq n, \qquad [4]$$

where $\tilde{W}_i$ is the required average waiting time of a transaction of type i. Using equations [2], [3], and [4], the QoS requirements [1] are equivalent to:

$$W_i \leq \tilde{W}_i, 1 \leq i \leq n. \qquad [5]$$

(2.2) Average Residual Time Estimation for all Sources

Next, a method to estimate the average residual time R of a transaction in service is determined. If $R_i$ denotes the average residual time of a transaction of type i, $1 \leq i \leq n$, then:

$$R = \sum_{1 \leq i \leq n} R_i \frac{\lambda_i}{\sum_{1 \leq i \leq n} \lambda_i}. \qquad [6]$$

For each i, $1 \leq i \leq n$, $R_i$ can be estimated using predetermined measurements made only when traffic (i.e., transactions) of type i is active in the system. In a system where only traffic of type i is active, the average waiting time of a transaction can be estimated as:

$$W_i^{(s)} = \frac{R_i}{1 - \rho_i}. \qquad [7]$$

By measuring $\lambda_i, \mu_i$, and $W_i^{(s)}, R_i$, $1 \leq i \leq n$, can be estimated as:

$$R_i = (1 - \rho_i) W_i^{(s)}, 1 \leq i \leq n. \qquad [8]$$

If it is assumed that $R_i$ is an affine function of $\lambda_i$, then $R_i$ can be estimated by making two distinct measurements for loads $\lambda_i^{(1)}$ and $\lambda_i^{(2)}$, and their corresponding residual times $R_i^{(1)}$ and $R_i^{(2)}$ as follows:

$$R_i = \frac{R_i^{(2)} - R_i^{(1)}}{\lambda_i^{(2)} - \lambda_i^{(1)}} \lambda_i + R_i^{(1)} - \lambda_i^{(1)} \frac{R_i^{(2)} - R_i^{(1)}}{\lambda_i^{(2)} - \lambda_i^{(1)}}. \qquad [9]$$

For given loads $\lambda_i$, $1 \leq i \leq n$, and service rates $\mu_i$, $1 \leq i \leq n$, the average residual time R given by equation [6] can be calculated using the standalone average residual time $R_i$, $1 \leq i \leq n$, given by equation [9]. To this extent, an incoming transaction of type i in the system is accepted if equation [5] is satisfied; otherwise the transaction is rejected.

The calculation of $W_i$ using equation [5] can be simplified by defining:

$$\sigma_i = 1 - \rho_1 - \rho_2 - \ldots - \rho_i, 1 \leq i \leq n. \qquad [10]$$

Then:

$$\sigma_i = \sigma_{i-1} - \rho_i, 2 \leq i \leq n, \qquad [11]$$

and:

$$W_i = \frac{W_{i-1}}{1 - \sigma_i}, 2 \leq i \leq n. \qquad [12]$$

(3) Measurement and Estimation Methodology

In view of the above, the following pre-measurement and real-time measurement steps can be performed to accept or reject a new incoming transaction into the system in order to meet the QoS requirements of all active transactions:

Pre-Measurements:
1. Measure the following quantities when only one traffic source (i.e., transaction type) is active in the system, for each i, $1 \leq i \leq n$:
   a. The average service rate $\mu_i$.
   b. The throughput rate $\lambda_i$.
   c. The average waiting time $W_i^{(1)}$ corresponding to a selected throughput rate value $\lambda_i^{(1)}$. The average waiting time can be deduced from the average response time by subtracting the average service time.
   d. The average waiting time $W_i^{(2)}$ corresponding to a selected throughput rate value $\lambda_i^{(2)}$.
2. Determine estimates:
   a. Estimate the average residual times $R_i^{(1)}$ corresponding to the selected throughput rate value $\lambda_i^{(1)}$ and the average waiting time $W_i^{(1)}$ using equation [8].
   b. Estimate the average residual times $R_i^{(2)}$ corresponding to the selected throughput rate value $\lambda_i^{(2)}$ and the average waiting time $W_i^{(2)}$ using equation [8].

Illustrative methodologies for service rate measurements, throughput rate measurements, and response time measurement are described, for example, by R. M. Bournas, hereafter "Bournas," in "A New Algorithm for the Load Balancing of Non-Identical Parallel Servers in the Absence of Complete State Information," IBM Corporation, Technical Report TR 40.0024, January 2000, incorporated herein by reference. See also, U.S. Pat. No. 6,748,414 to Bournas, incorporated herein by reference.

Real-time Measurements to Guarantee QoS Requirements:

A new incoming request for a transaction of type k, in an environment where all n transactions are active, is accepted or rejected by performing the following steps:
1. Measure the throughput rate $\lambda_i$ for each type of transaction i, $1 \leq i \leq n$, upon receipt of the request for a transaction of type k.
2. Calculate the average residual time $R_i$ for each type of transaction i, $1 \leq i \leq n$ using equation [9].
3. Calculate the average residual time R of a transaction in service using equation [6].
4. Calculate the average waiting time $W_k$ of a transaction of type k using the recursive equations [12].
5. If equation [5] holds for i=k, then accept the incoming transaction of type k into the system; otherwise reject it. That is, if the average waiting time $W_k$ for an incoming transaction of type k is less than or equal to the required average waiting time $W_{\bar{k}}$ for a transaction of type k, then accept the incoming transaction, otherwise reject it.

It should be noted that the above-described methodology can also be applied when there are several duplicate servers running and invoked by a load balancer. In this case, each duplicate server will make a decision of whether to accept or reject a new transaction using the above method. It should also be noted that the above-described methodology can he used when there are several replications of the same server.

(4) Conclusion

The above analysis leads to the calculation of an estimate of the average waiting time of a transaction of type i, $1 \leq i \leq n$, in a server system running n applications simultaneously. The analysis is based on prioritizing the service based on the QoS requirements: the smaller the QoS requirement, the higher the priority of service. The present invention also provides a methodology to dynamically decide whether to accept or reject a new incoming transaction in a server system running several applications. The decision is made to assure that all QoS requirements of all transactions running in the system at the time of arrival of the new transaction are met.

To summarize the above description of the present invention, at the arrival of a new transaction, the transaction is accepted if and only if:
(A) The QoS for the new transaction will be met; and
(B) The QoS for all other queued transactions in the server will also be met. The decision to accept or reject a new transaction is based on the following information:
(A) The system throughput rates $\lambda_i$ for each i, $1 \leq i \leq n$, at the time of arrival of the new transaction;
(B) The QoS requirements $T_i$ for each i, $1 \leq i \leq n$;
(C) The service rates $\mu_i$, $1 \leq i \leq n$, of each transaction of type i, $1 \leq i \leq n$;
(D) The average load $\rho_i = \lambda_i/\mu_i$, $1 \leq i \leq n$, of each application i, $1 \leq i \leq n$;
(E) The average residual time R of a transaction in service;
(F) The average residual time $R_i$ of a transaction of type i, $1 \leq i \leq n$;
(G) The average waiting time $W_i$ of a transaction of type i, $1 \leq i \leq n$;
(H) The average required waiting time $W_{\bar{i}}$ of a transaction of type i, $1 \leq i \leq n$; and
(I) The average waiting time $W_i^{(s)}$ of a transaction of type i, $1 \leq i \leq n$, in an environment in which only transactions of this type are active.

Figure 2:
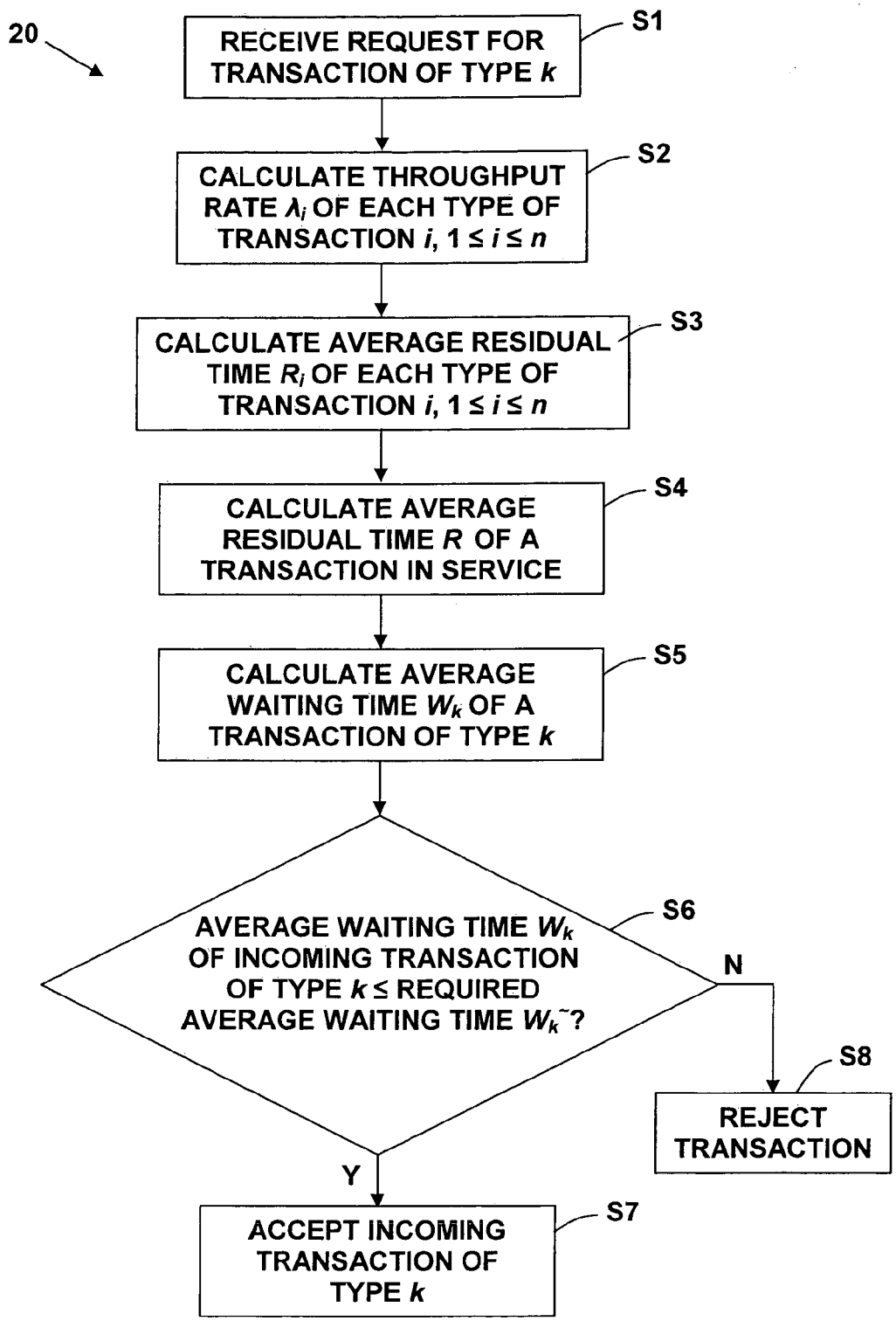
FIG. 2 depicts a flow diagram of a method in accordance with an embodiment of the present invention.

FIG. 2 depicts a flow diagram 20 of a method in accordance with an embodiment of the present invention. In step S1, a request for a new transaction of type k is received. In step S2, the throughput rate $\lambda_i$ of each type of transaction i, $1 \leq i \leq n$, is calculated, at the time of arrival of the request for the new transaction k. In step S3, the average residual time $R_i$ of each type of transaction i, $1 \leq i \leq n$, is calculated. In step S4, the average residual time R of a transaction in service, is calculated. In step S5, the average waiting time $W_k$ of a transaction of type k is calculated. In step S6, if the average waiting time $W_k$ of the incoming transaction of type k is less than or equal to the required average waiting time $W_{\bar{k}}$ of a transaction of type k, then the incoming transaction of type k is accepted (step S7). If not, the incoming transaction of type k is rejected (step S8).

Figure 3:
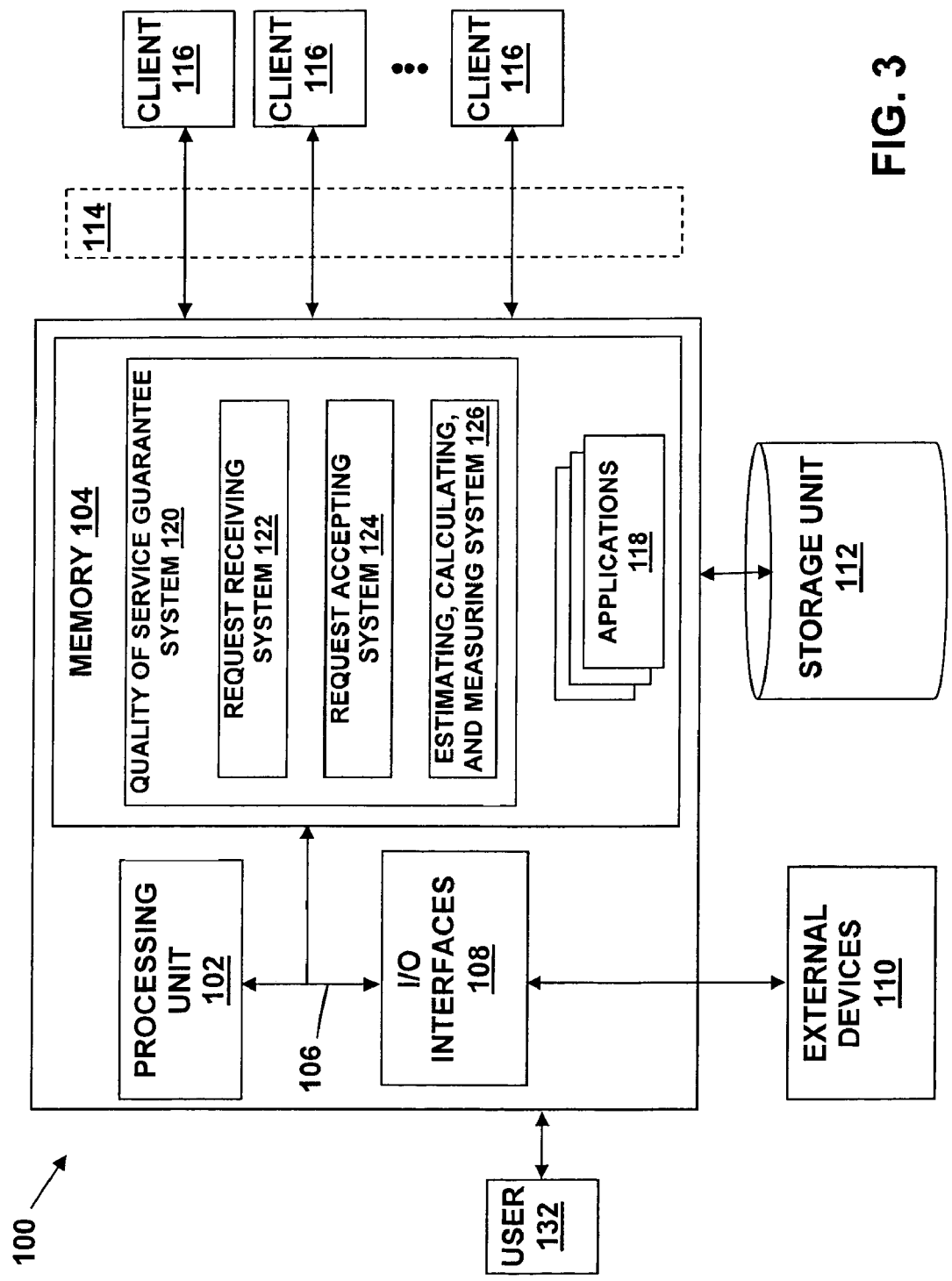
FIG. 3 depicts an application server implementing a method in accordance with an embodiment of the present invention.

An application server 100 implementing a method in accordance with an embodiment of the present invention is depicted in FIG. 3. As shown, application server 100 generally includes a processing unit 102, memory 104, bus 106, input/output (I/O) interfaces 108, external devices/resources 110, and storage unit 112. Processing unit 102 may comprise a single processing unit, or may be distributed across one or more processing units in one or more locations. Memory 104 may comprise any known type of data storage and/or transmission media, including magnetic media, optical media, random access memory (RAM), read-only memory (ROM), etc. Moreover, similar to processing unit 102, memory 104 may reside at a single physical location, comprising one or more types of data storage, or be distributed across a plurality of physical systems in various forms.

I/O interfaces 108 may comprise any system for exchanging information to/from an external source. External devices/resources 110 may comprise any known type of external device, including speakers, a CRT, LED screen, handheld device, keyboard, mouse, voice recognition system, speech output system, printer, monitor/display, facsimile, pager, etc.

Bus 106 provides a communication link between each of the components in application server 100, and likewise may comprise any known type of transmission link, including electrical, optical, wireless, etc. In addition, although not shown, additional components, such as cache memory, communication systems, system software, etc., may be incorporated into the application server 100.

Data used in the practice of the present invention can be stored locally to application server 100, for example, in storage unit 112, and/or may be provided to application server 100 over a network 114. Storage unit 112 can be any system capable of providing storage for data and information under the present invention. As such, storage unit 112 may reside at a single physical location, comprising one or more types of data storage, or may be distributed across a plurality of physical systems in various forms. In another embodiment, storage unit 112 may be distributed across, for example, a local area network (LAN), wide area network (WAN) or a storage area network (SAN) (not shown).

Network 114 is intended to represent any type of network over which data can be transmitted. For example, network 114 can include the Internet, a wide area network (WAN), a local area network (LAN), a virtual private network (VPN), a WiFi network, or other type of network. To this extent, communication can occur via a direct hardwired connection or via an addressable connection in a client-server (or server-server) environment that may utilize any combination of wireline and/or wireless transmission methods. In the case of the latter, the server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server. At least one client device 116 is connected to application server 100 via network 114. Each client device 116 comprises components similar to those described above with regard to application server 100.

Application server 100 includes a plurality of applications 118 for performing transactions requested by client devices 116. Client devices 116 send requests for transactions to the application server 100 for servicing.

Shown in memory 104 as a computer program product is a quality of service (QoS) guarantee system 120 for providing QoS guarantees at the application 118 level for the client devices 116 of application server 100. QoS guarantee system 120 includes a request receiving system 122 for receiving requests for new transactions from client devices 116, a request accepting system 124 for selectively accepting new transactions from the client devices 116 such that the QoS guarantees for all transactions can be met, and an estimating, calculating, and measuring system 126 for determining the various values required by the request accepting system 124.

It should be appreciated that the teachings of the present invention can be offered as a business method on a subscription or fee basis. For example, one or more components of the present invention could be created, maintained, supported, and/or deployed by a service provider that offers the functions described herein for customers. That is, a service provider could be used to provide quality of service guarantees at the application level for clients of application servers, as describe above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein.

Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for providing quality of service guarantees in a system, comprising:

receiving a request for a transaction of type k; calculating a throughput rate $\lambda_i$ of each type of transaction $i \leq 1 \leq i$ n, in response to the request for the transaction of type k;

calculating, based on the calculated throughput rate $\lambda_i$, an average residual time $R_i$ of each type of transaction $i \leq 1 \leq i$ n;

calculating, based on the calculated average residual time $R_i$, an average residual time R of a transaction in service;

calculating, based on the calculated average residual time R, an average waiting time $W_k$ of a transaction of type k;

comparing the average waiting time $W_k$ of a transaction of type k to a required average waiting time $W_k \sim$ of a transaction of type k; and selectively accepting the request for the transaction of type k, based on a result of the comparing step, wherein the request for the transaction of type k is accepted if the average waiting time $W_k$ is less than or equal to the required average waiting time $W_k \sim$;

wherein a required quality of service guarantee of each transaction in the system is met; and wherein the system is running n applications simultaneously and comprises an application server and a plurality of clients.

2. A system for providing quality of service guarantees in a server system, comprising:

at least one computer, including:

a system for receiving a request for a transaction of type k;

a system for calculating a throughput rate $\lambda_i$ of each type of transaction $i \leq 1 \leq i$ n, in response to the request for the transaction of type k;

a system for calculating, based on the calculated throughput rate $\lambda_i$, an average residual time $R_i$ of each type of transaction $i \leq 1 \leq i$ n;

a system for calculating, based on the calculated average residual time $R_i$, an average residual time R of a transaction in service;

a system for calculating, based on the calculated average residual time R, an average waiting time $W_k$ of a transaction of type k;

a system for comparing the average waiting time $W_k$ of a transaction of type k to a required average waiting time $W_k\sim$ of a transaction of type k; and a system for selectively accepting the request for the transaction of type k, based on a result of the comparing step, wherein the request for the transaction of type k is accepted if the average waiting time $W_k$ is less than or equal to the required average waiting time $W_k\sim$;

wherein a required quality of service guarantee of each transaction in the system is met; and wherein the system is running n applications simultaneously and comprises an application server and a plurality of clients.

3. A program product stored on a computer recordable medium, which when executed, provides quality of service guarantees in a system, the program product comprising program code for:

receiving a request for a transaction of type k; calculating a throughput rate $\lambda_i$ of each type of transaction $i \leq 1 \leq n$, in response to the request for the transaction of type k;

calculating, based on the calculated throughput rate $\lambda_i$, an average residual time $R_i$ of each type of transaction $i \leq 1 \leq n$;

calculating, based on the calculated average residual time $R_i$, an average residual time R of a transaction in service;

calculating, based on the calculated average residual time R, an average waiting time $W_k$ of a transaction of type k;

comparing the average waiting time $W_k$ of a transaction of type k to a required average waiting time $W_k\sim$ of a transaction of type k; and selectively accepting the request for the transaction of type k, based on a result of the comparing step, wherein the request for the transaction of type k is accepted if the average waiting time $W_k$ is less than or equal to the required average waiting time $W_k\sim$;

wherein a required quality of service guarantee of each transaction in the system is met; and wherein the system is running n applications simultaneously and comprises an application server and a plurality of clients.

* * * * *